United States Patent
Rafey et al.

(10) Patent No.: US 11,467,884 B2
(45) Date of Patent: Oct. 11, 2022

(54) DETERMINING A DEPLOYMENT SCHEDULE FOR OPERATIONS PERFORMED ON DEVICES USING DEVICE DEPENDENCIES AND PREDICTED WORKLOADS

(71) Applicant: Dell Products L.P., Round Rock, TX (US)

(72) Inventors: Mohammad Rafey, Bangalore (IN); Parminder Singh Sethi, Ludhiana (IN); Hung Dinh, Austin, TX (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 17/066,647

(22) Filed: Oct. 9, 2020

(65) Prior Publication Data
US 2022/0114031 A1    Apr. 14, 2022

(51) Int. Cl.
*G06F 15/173*    (2006.01)
*G06F 9/50*    (2006.01)
*H04L 41/0813*    (2022.01)

(52) U.S. Cl.
CPC ........ *G06F 9/5083* (2013.01); *H04L 41/0813* (2013.01)

(58) Field of Classification Search
CPC .................................................. H04L 41/0813
See application file for complete search history.

(56) References Cited

U.S. PATENT DOCUMENTS 10,671,431 B1 *  6/2020  Dolan ................... G06F 3/0649
2022/0114031 A1 *  4/2022  Rafey ................. H04L 41/0813

OTHER PUBLICATIONS

N. E. Helwig, "Multivariate Linear Regression," University of Minnesota, Jan. 17, 2017, 84 pages.
NEO4J Team, The Neo4j Getting Started Guide v4.1, https://neo4j.com/docs/getting-started/current/, 2020, 27 pages.
G. Jeh et al., "SimRank: A Measure of Structural-Context Similarity," In Proceedings of the 8th ACM SIGKDD International Conference on Knowledge Discovery and Data Mining, Jul. 2002, 11 pages.
R. N. Sucky, "Multivariate Linear Regression in Python Step by Step," https://towardsdatascience.com/multivariate-linear-regression-in-python-step-by-step-128c2b127171, Jun. 25, 2020, 8 pages.

* cited by examiner

*Primary Examiner* — Thanh T Nguyen
(74) *Attorney, Agent, or Firm* — Ryan, Mason & Lewis, LLP (57) ABSTRACT

An apparatus comprises a processing device configured to generate a model characterizing relationships between devices in an information technology infrastructure, to build a device dependency chain for the devices based at least in part on the generated model, and to predict workload for each of the devices in each of two or more time slots of a given time period. The processing device is also configured to determine a deployment schedule for the devices based at least in part on the device dependency chain and the predicted workload for each of the devices in each of the two or more time slots of the given time period, to identify an operation to be performed on the devices, and to utilize the deployment schedule to select ones of the devices on which to perform the identified operation in each of the two or more time slots of the given time period.

20 Claims, 11 Drawing Sheets

| DEVICE ID | DATE TIME SLOT | CPU UTILIZATION (%) | MEMORY UTILIZATION (%) | AVAILABILITY (%) | RESPONSE TIME (ms) | DISK UTILIZATION (%) |
|---|---|---|---|---|---|---|
| SRD-1 | 11/7/2020 1:00-2:00 | 67 | 75 | 78 | 19 | 65 |
| SRD-1 | 11/7/2020 2:00-3:00 | 88 | 70 | 88 | 44 | 42 |
| SRD-1 | 11/7/2020 3:00-4:00 | 50 | 55 | 94 | 10 | 83 |
| SRD-1 | 11/7/2020 4:00-5:00 | 77 | 44 | 91 | 7 | 54 |
| SRD-1 | 11/7/2020 5:00-6:00 | 63 | 48 | 65 | 21 | 22 |
| SRD-1 | 11/7/2020 6:00-7:00 | 55 | 65 | 83 | 75 | 83 |
| SRD-1 | 11/7/2020 7:00-8:00 | 44 | 42 | 54 | 70 | 54 |
| SRD-1 | 11/7/2020 8:00-9:00 | 48 | 83 | 65 | 55 | 55 |
| SRD-1 | 11/7/2020 9:00-10:00 | 35 | 54 | 42 | 83 | 44 |
| SRD-1 | 11/7/2020 10:00-11:00 | 83 | 65 | 83 | 54 | 48 |
| SRD-1 | 11/7/2020 11:00-12:00 | 54 | 42 | 42 | 65 | 83 |
| SRD-1 | 11/7/2020 12:00-13:00 | 43 | 83 | 83 | 42 | 54 |
| SRD-1 | 11/7/2020 13:00-14:00 | 35 | 54 | 83 | 83 | 65 |
| SRD-1 | 11/7/2020 14:00-15:00 | 87 | 44 | 54 | 55 | 42 |
| SRD-1 | 11/7/2020 15:00-16:00 | 83 | 48 | 65 | 44 | 83 |
| SRD-1 | 11/7/2020 16:00-17:00 | 54 | 75 | 42 | 48 | 70 |
| SRD-1 | 11/7/2020 17:00-18:00 | 34 | 70 | 83 | 83 | 55 |
| SRD-1 | 11/7/2020 18:00-19:00 | 65 | 55 | 23 | 54 | 42 |
| SRD-1 | 11/7/2020 19:00-20:00 | 42 | 83 | 65 | 87 | 83 |
| SRD-1 | 11/7/2020 20:00-21:00 | 83 | 54 | 65 | 75 | 54 |
| SRD-1 | 11/7/2020 21:00-22:00 | 54 | 65 | 42 | 70 | 65 |
| SRD-1 | 11/7/2020 22:00-23:00 | 42 | 42 | 83 | 83 | 83 |
| SRD-1 | 11/7/2020 23:00-24:00 | 83 | 83 | 54 | 54 | 54 |

| DEVICE ID | DATE TIME SLOT | CPU UTILIZATION (%) | MEMORY UTILIZATION (%) | AVAILABILITY (%) | RESPONSE TIME (ms) | DISK UTILIZATION (%) |
|---|---|---|---|---|---|---|
| SRD-2 | 11/7/2020 1:00-2:00 | 54 | 75 | 78 | 19 | 65 |
| SRD-2 | 11/7/2020 2:00-3:00 | 88 | 70 | 88 | 44 | 42 |
| SRD-2 | 11/7/2020 3:00-4:00 | 42 | 94 | 94 | 10 | 54 |
| SRD-2 | 11/7/2020 4:00-5:00 | 83 | 91 | 91 | 7 | 34 |
| SRD-2 | 11/7/2020 5:00-6:00 | 83 | 65 | 65 | 21 | 65 |
| SRD-2 | 11/7/2020 6:00-7:00 | 87 | 65 | 83 | 34 | 42 |
| SRD-2 | 11/7/2020 7:00-8:00 | 54 | 42 | 54 | 70 | 54 |
| SRD-2 | 11/7/2020 8:00-9:00 | 48 | 83 | 65 | 55 | 55 |
| SRD-2 | 11/7/2020 9:00-10:00 | 35 | 54 | 42 | 83 | 44 |
| SRD-2 | 11/7/2020 10:00-11:00 | 83 | 65 | 83 | 54 | 48 |
| SRD-2 | 11/7/2020 11:00-12:00 | 54 | 42 | 42 | 65 | 83 |
| SRD-2 | 11/7/2020 12:00-13:00 | 43 | 83 | 83 | 42 | 54 |
| SRD-2 | 11/7/2020 13:00-14:00 | 35 | 94 | 83 | 83 | 65 |
| SRD-2 | 11/7/2020 14:00-15:00 | 87 | 91 | 87 | 55 | 42 |
| SRD-2 | 11/7/2020 15:00-16:00 | 83 | 65 | 65 | 44 | 83 |
| SRD-2 | 11/7/2020 16:00-17:00 | 54 | 75 | 42 | 48 | 70 |
| SRD-2 | 11/7/2020 17:00-18:00 | 34 | 70 | 83 | 83 | 35 |
| SRD-2 | 11/7/2020 18:00-19:00 | 65 | 55 | 45 | 54 | 54 |
| SRD-2 | 11/7/2020 19:00-20:00 | 42 | 83 | 65 | 23 | 34 |
| SRD-2 | 11/7/2020 20:00-21:00 | 45 | 54 | 65 | 94 | 65 |
| SRD-2 | 11/7/2020 21:00-22:00 | 54 | 65 | 42 | 91 | 42 |
| SRD-2 | 11/7/2020 22:00-23:00 | 42 | 42 | 83 | 65 | 54 |
| SRD-2 | 11/7/2020 23:00-24:00 | 83 | 83 | 54 | 54 | 54 |

```
import pandas as pd
import numpy as np
from sklearn.linear_model import LinearRegression
from sklearn.metrics import mean_squared_error

# Read workload captured data.
df = pd.read_csv('device-workload-data.csv')
df.head()

# Input data provides data time slot wise workload data for devices on an hourly basis.
# Device management tool takes into account the captured data and performs a multi
# variate linear regression analysis to predict the workload for each time slot of the day.
y = df['workload-data-device']
x = df[['cpu-util', 'memory-util', 'availability', 'response-time', 'disk-util']]

# Define Multi Variate Linear Regression Model.
linear_regress = LinearRegression()

# Train Multi Variate Linear Regression Model.
linear_regress.fit(x,y)

# Workload Prediction.
y_pred = linear_regress.predict(x)
```

DETERMINING A DEPLOYMENT SCHEDULE FOR OPERATIONS PERFORMED ON DEVICES USING DEVICE DEPENDENCIES AND PREDICTED WORKLOADS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing information processing systems.

BACKGROUND

Data centers may include large numbers of devices, such as servers, that are centrally managed. Different subsets of the devices within a data center may host different applications. When an application needs to be updated, a central management tool of the data center pushes the update to the subset of the devices in the data center which host that application. Such updates may be pushed to the different devices in a sequential fashion, in parallel to each of the devices hosting the application, or some combination thereof. There is a need for optimizing the deployment of updates or other actions to devices in data centers.

SUMMARY

Illustrative embodiments of the present invention provide techniques for determining deployment schedules for operations to be performed on devices using device dependencies and predicted workloads.

In one embodiment, an apparatus comprises at least one processing device comprising a processor coupled to a memory. The at least one processing device is configured to perform the steps of generating a model of a plurality of devices in an information technology infrastructure, the generated model characterizing relationships between the plurality of devices, building a device dependency chain for the plurality of devices based at least in part on the generated model characterizing the relationships between the plurality of devices, and predicting workload for each of the plurality of devices in each of two or more time slots of a given time period. The at least one processing device is also configured to perform the steps of determining a deployment schedule for the plurality of devices based at least in part on the device dependency chain and the predicted workload for each of the plurality of devices in each of the two or more time slots of the given time period, identifying an operation to be performed on the plurality of devices, and utilizing the deployment schedule to select ones of the plurality of devices on which to perform the identified operation in each of the two or more time slots of the given time period.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
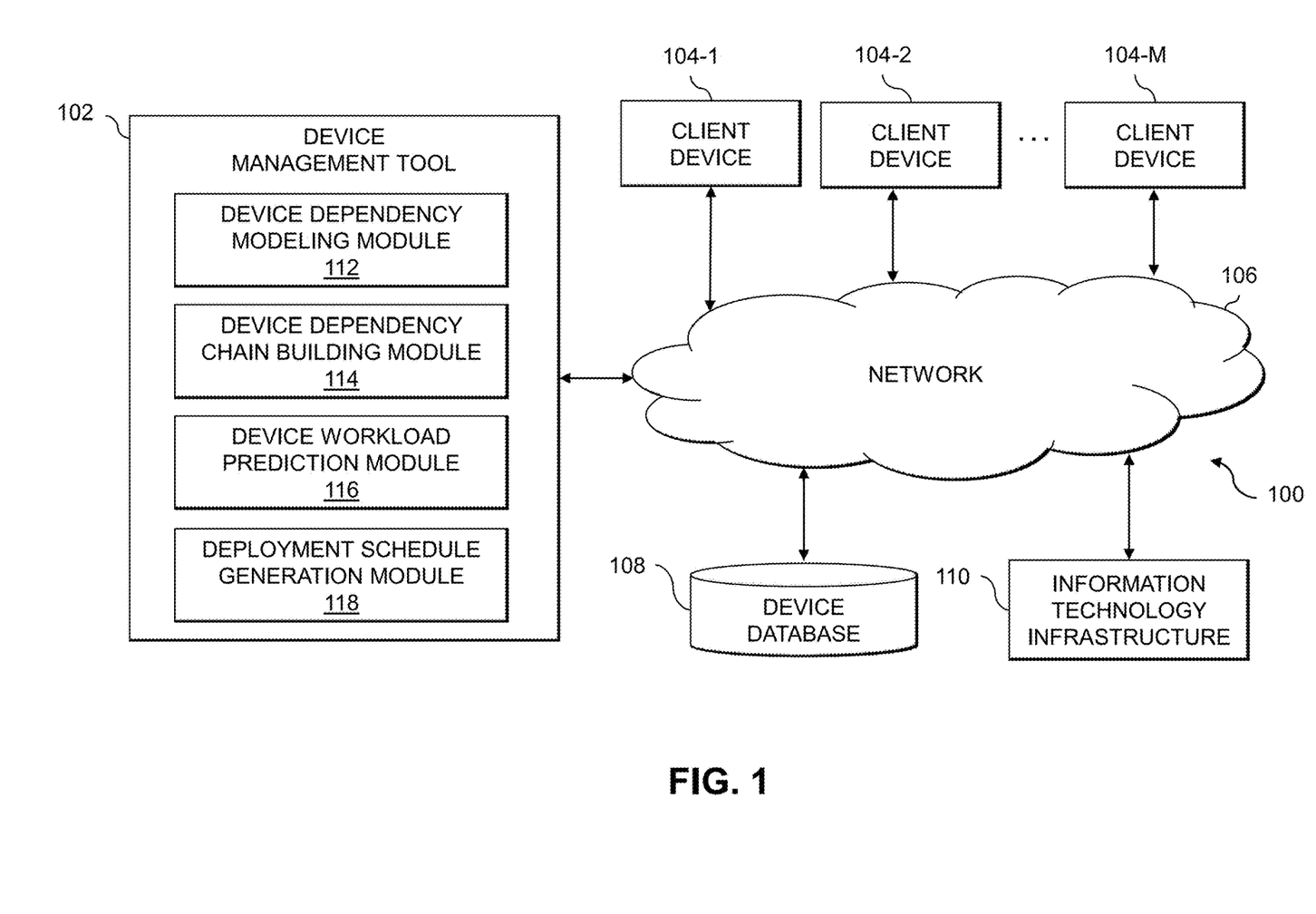
FIG. 1 is a block diagram of an information processing system configured for determining deployment schedules for operations to be performed on devices using device dependencies and predicted workloads in an illustrative embodiment of the invention.

FIG. 1 shows an information processing system 100 configured in accordance with an illustrative embodiment. The information processing system 100 is assumed to be built on at least one processing platform and provides functionality for determining deployment schedules for operations to be performed on devices using device dependencies and predicted workloads. The information processing system 100 includes a device management tool 102, which is coupled via a network 106 to an information technology (IT) infrastructure 110. The IT infrastructure 110 is assumed to be accessed, over network 106, by client devices 104-1, 104-2, ... 104-M (collectively, client devices 104). The system 100 also includes a device database 108 coupled to the network 106, which may store various information related to operation of devices or assets of the IT infrastructure 110. The devices or assets of the IT infrastructure 110 may include, by way of example, physical and virtual computing resources in the IT infrastructure 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), software containers also referred to as containers, etc.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The device database 108 may be any type of database configured to store information related to the devices or assets of the IT infrastructure 110, including device dependency information, historical workload information, deployment schedules, etc. The device database 108 in some embodiments is implemented using one or more storage systems or devices associated with the device management tool 102. In some embodiments, one or more of the storage systems utilized to implement the device database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the device management tool 102, as well as to support communication between the device management tool 102 and other related systems and devices not explicitly shown.

In some embodiments, the client devices 104 may implement host agents that are configured for communication with the device management tool 102. The host agents implemented by the client devices 104 may be configured to interact with a graphical user interface and visualizations thereof that are produced by the device management tool 102 for presenting deployment schedules for devices in the IT infrastructure 110. The host agents may permit users of the client devices 104 to interact with user interface features of the graphical user interface to view and possibly modify the deployment schedules, to initiate updates or other actions using the deployment schedules, etc.

It should be noted that a "host agent" as this term is generally used herein may comprise an automated entity, such as a software entity running on a processing device. Accordingly, a host agent need not be a human entity.

Although shown as separate from the client devices 104 and the IT infrastructure 110 in the FIG. 1 embodiment, it should be appreciated that the device management tool 102 may be implemented at least in part within one or more of the client devices 104 or at least in part within the IT infrastructure 110, or combinations thereof, in some embodiments.

The device management tool 102 in the FIG. 1 embodiment is assumed to be implemented using at least one processing device. Each such processing device generally comprises at least one processor and an associated memory, and implements one or more functional modules for controlling certain features of the device management tool 102. In the FIG. 1 embodiment, the device management tool 102 implements a device dependency modeling module 112, a device dependency chain building module 114, a device workload prediction module 116, and a deployment schedule generation module 118.

The device dependency modeling module 112 is configured to generate a model of a plurality of devices in the IT infrastructure 110. The generated model characterizes relationships between the plurality of devices. The device dependency chain building module 114 is configured to build a device dependency chain for the plurality of devices based at least in part on the generated model characterizing the relationships between the plurality of devices. The device workload prediction module 116 is configured to predict workload for each of the plurality of devices in each of two or more time slots of a given time period. The deployment schedule generation module 118 is configured to determine a deployment schedule for the plurality of devices based at least in part on the device dependency chain and the predicted workload for each of the plurality of devices in each of the two or more time slots of the given time period. The device management tool 102 is configured to identify an operation to be performed on the plurality of devices, and to utilize the deployment schedule to select ones of the plurality of devices on which to perform the identified operation in each of the two or more time slots of the given time period.

It is to be appreciated that the particular arrangement of the device management tool 102, the device dependency modeling module 112, the device dependency chain building module 114, the device workload prediction module 116, and the deployment schedule generation module 118 illustrated in the FIG. 1 embodiment is presented by way of example only, and alternative arrangements can be used in other embodiments. As discussed above, for example, the device management tool 102, the device dependency modeling module 112, the device dependency chain building module 114, the device workload prediction module 116, and the deployment schedule generation module 118 may in some embodiments be implemented internal to one or more of the client devices 104, the IT infrastructure 110, or combinations thereof. As another example, the functionality associated with the device dependency modeling module 112, the device dependency chain building module 114, the device workload prediction module 116, and the deployment schedule generation module 118 may be combined into fewer modules, or separated across more modules with the multiple modules possibly being implemented with multiple distinct processors or processing devices.

At least portions of the device dependency modeling module 112, the device dependency chain building module 114, the device workload prediction module 116, and the deployment schedule generation module 118 may be implemented at least in part in the form of software that is stored in memory and executed by a processor.

It is to be understood that the particular set of elements shown in FIG. 1 for determining deployment schedules for operations to be performed on devices using device dependencies and predicted workloads is presented by way of illustrative example only, and in other embodiments additional or alternative elements may be used. Thus, another embodiment may include additional or alternative systems, devices and other network entities, as well as different arrangements of modules and other components.

The device management tool 102 and other portions of the system 100 may be part of cloud infrastructure as will be described in further detail below. The cloud infrastructure hosting the device management tool 102 may also host one or more of the client devices 104, the device database 108 and the IT infrastructure 110.

The device management tool 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The device management tool 102, client devices 104, device database 108 and IT infrastructure 110 or components thereof may be implemented on respective distinct processing platforms, although numerous other arrangements are possible. For example, in some embodiments at least portions of the device management tool 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the device management tool 102, client devices 104, device database 108, IT infrastructure 110, or portions or components thereof, to reside in different data centers. Numerous other distributed implementations are possible. The device management tool 102 or portions thereof can also be implemented in a distributed manner across multiple data centers.

Additional examples of processing platforms utilized to implement the device management tool 102 and other portions of the system 100 in illustrative embodiments will be described in more detail below in conjunction with FIGS. 9 and 10.

It is to be appreciated that these and other features of illustrative embodiments are presented by way of example only, and should not be construed as limiting in any way.

Figure 2:
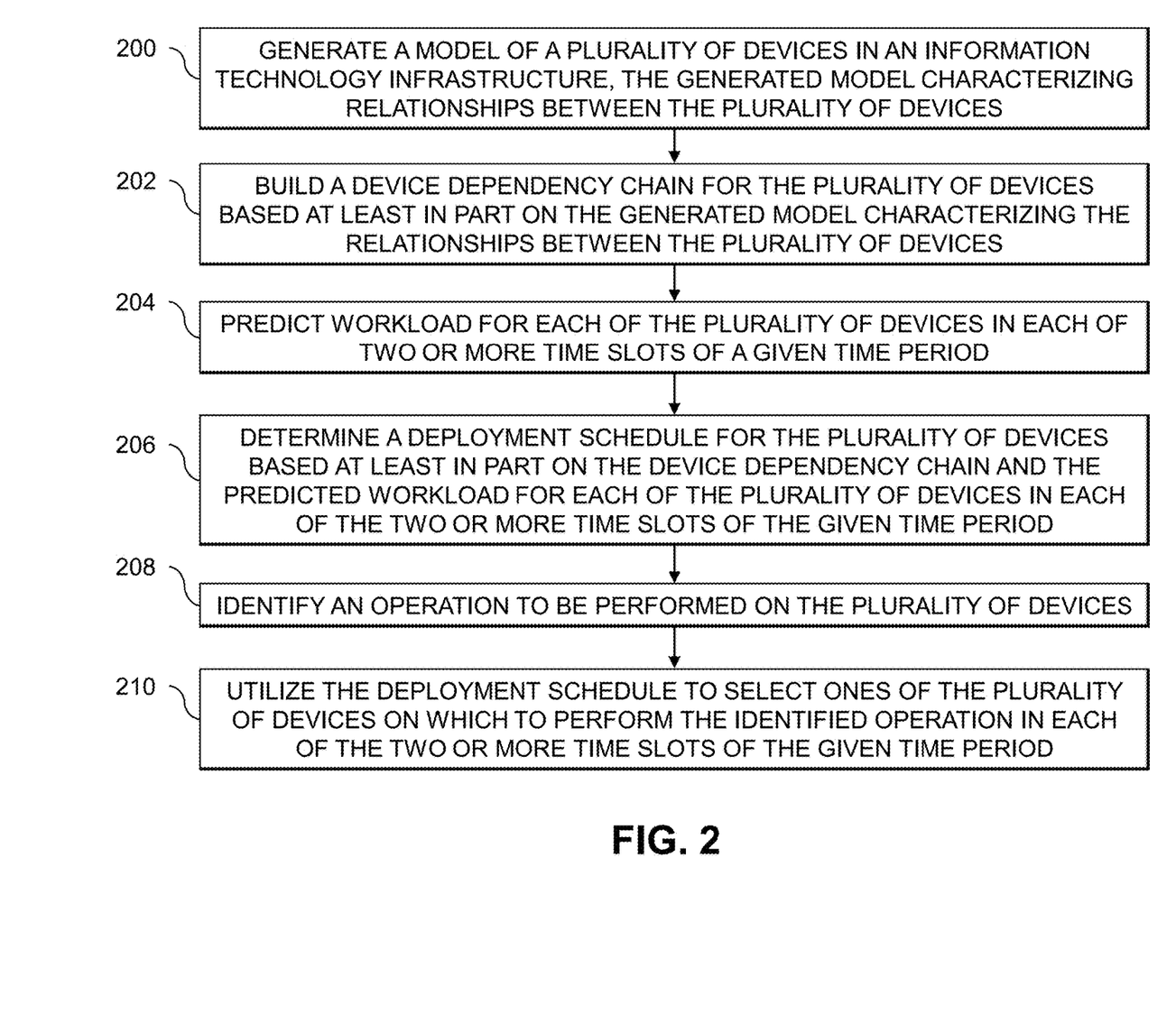
FIG. 2 is a flow diagram of an exemplary process for determining deployment schedules for operations to be performed on devices using device dependencies and predicted workloads in an illustrative embodiment.

An exemplary process for determining deployment schedules for operations to be performed on devices using device dependencies and predicted workloads will now be described in more detail with reference to the flow diagram of FIG. 2. It is to be understood that this particular process is only an example, and that additional or alternative processes for determining deployment schedules for operations to be performed on devices using device dependencies and predicted workloads may be used in other embodiments.

In this embodiment, the process includes steps 200 through 210. These steps are assumed to be performed by the device management tool 102 utilizing the device dependency modeling module 112, the device dependency chain building module 114, the device workload prediction module 116, and the deployment schedule generation module 118. The process begins with step 200, generating a model of a plurality of devices in an IT infrastructure. The generated model characterizes relationships between the plurality of devices. The plurality of devices may comprise servers in a data center, IoT devices, etc. The model of the plurality of devices comprises a directed weighted graph with nodes representing the plurality of devices and edges between the nodes representing call relationships between the plurality of devices. A given edge weight associated with a given edge between a first node and a second node in the directed weighted graph may be based at least in part on a number of requests between the first node and the second node and an amount of data exchanged between the first node and the second node. The given edge weight comprises a normalized edge weight.

In step 202, a device dependency chain is built for the plurality of devices based at least in part on the generated model characterizing the relationships between the plurality of devices. Step 202 may comprise computing an overall dependency score for each of the plurality of devices, the overall dependency score for a given device comprising a sum of pairwise dependency scores characterizing activity between the given device and each of at least a subset of other ones of the plurality of devices that have call relationships with the given device. The process continues with step 204, predicting workload for each of the plurality of devices in each of two or more time slots of a given time period. The given time period may comprise a day, and the two or more time slots may comprise hours in the day. Step 204 may comprise utilizing a machine learning regression analysis. The machine learning regression analysis may comprise a multivariate linear regression analysis. The multivariate linear regression analysis is based at least in part on two or more of processor utilization of the plurality of devices, memory utilization of the plurality of devices, availability of the plurality of devices, response time of the plurality of devices, and disk utilization of the plurality of devices.

A deployment schedule for the plurality of devices is determined in step 206 based at least in part on the device dependency chain and the predicted workload for each of the plurality of devices in each of the two or more time slots of the given time period. Step 206 may comprise, for a given one of the two or more time slots of the given time period, identifying a subset of the devices whose lowest predicted workload is in the given time slot and selecting an order in which the identified subset of the devices whose lowest predicted workload is in the given time slot in decreasing order of dependency scores obtained from the device dependency chain. In step 208, an operation to be performed on the plurality of devices is identified. The deployment schedule is utilized in step 210 to select ones of the plurality of devices on which to perform the identified operation in each of the two or more time slots of the given time period. The plurality of devices host an application, and the identified operation to be performed on the plurality of devices may comprise updating the application. The deployment schedule may specify a sequence in which the identified operation is to be performed on the plurality of devices.

In modern enterprise data centers, there may be hundreds or thousands of devices (e.g., servers) managed by a centralized device management tool (DMT). Such devices are examples of what is more generally referred to herein as assets of an IT infrastructure, which as noted above, may include physical and/or virtual computing resources. In a heterogeneous data center (e.g., where different subsets of the devices are implemented using different types of physical and/or virtual computing resources), a subset of the devices may be used to host a specific application. When there is an update or upgrade available for that application, the centralized DMT will promote or push the update or upgrade to the specific subset of devices hosting that application. The centralized DMT may promote or push the update or upgrade in a random fashion, according to the workload of individual ones of the subset of devices hosting the application, etc. In some cases, the upgrade proceeds in a sequential fashion. In other cases, the upgrade proceeds or runs at least partially in parallel.

Conventional DMT implementations do not have functionality or built-in intelligent features for optimizing upgrade or other deployment schedules systematically. Conventional DMT implementations therefore fail to take into account and consider the current state of each device (or, more generally, asset of an IT infrastructure such as a physical or virtual computing resource) before pushing an upgrade. In some cases, upgrades are resource-intensive processes. Pushing upgrades by random or fixed methods can decrease the performance of devices and applications hosted by the devices, as well as decreasing the performance of a data center or IT infrastructure as a whole. Conventional approaches for pushing upgrades tend to be fundamentally heuristics-based, and are therefore too costly, risky and unreliable resulting in unexpected outages and other negative impacts on end-user satisfaction.

Illustrative embodiments provide techniques for augmenting a DMT in order to optimize deployment schedules for upgrade or other actions to be performed on devices of a data center (or, more generally, assets of an IT infrastructure) systematically and intelligently. To do so, some embodiments formulate a device dependency chain (more generally, an asset dependency chain) using a directed weighted graph. Advantageously, this solution takes into consideration device or other asset conditions, resource utilization, and availability from a historical data perspective to predict the right order to push upgrades in a manner that minimizes impact and optimizes deployment across a data center or IT infrastructure.

Figure 3:
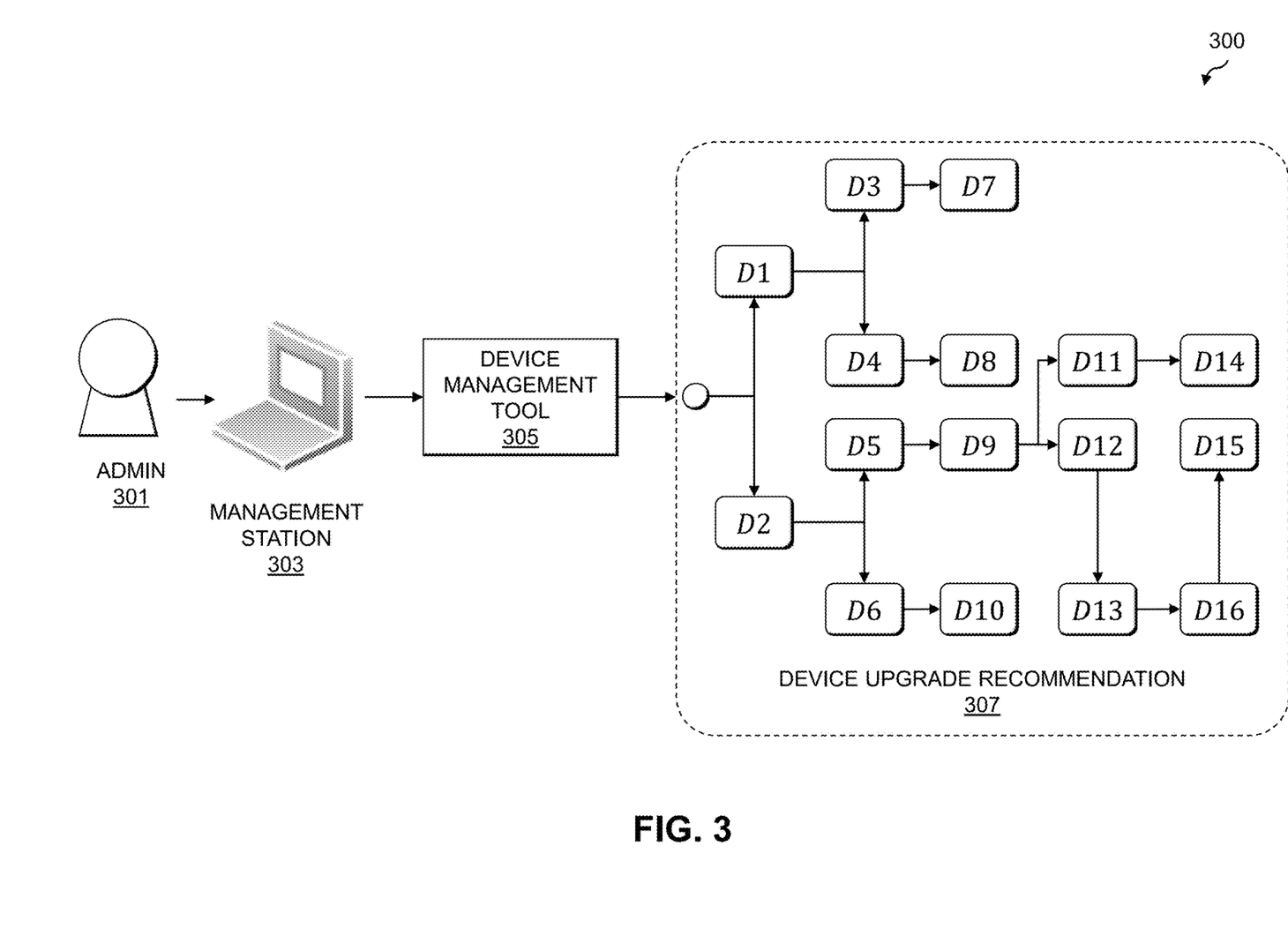
FIG. 3 shows device upgrade recommendation output for a data center in an illustrative embodiment.

As noted above, some embodiments formulate a device or other asset dependency chain using a directed weighted graph in order to create relationships between devices or other assets in a data center or IT infrastructure. The devices or other assets of the data center or IT infrastructure may be dependent or independent of one another, in terms of their serviceability and currently installed software stacks (e.g., in terms of prerequisites, corequisites, and other parameters that are important for building upgrade paths). Advantageously, some embodiments define a sequence in which the upgrade should happen. FIG. 3 illustrates a device upgrade recommendation output for a complex data center 300. An administrator 301 or other authorized user utilizes an administration management station 303 in order to access a DMT 305. The DMT 305 produces a device upgrade recommendation 307 for a set of devices or assets in the data center 300 denoted D1 through D16. The device upgrade recommendation 307 may specify a recommended upgrade order or sequence for the set of devices or assets. In the FIG. 3 example, the recommended upgrade order or sequence is a hybrid of parallel and sequential pushing of upgrades to the devices D1 through D16.

Figure 4:
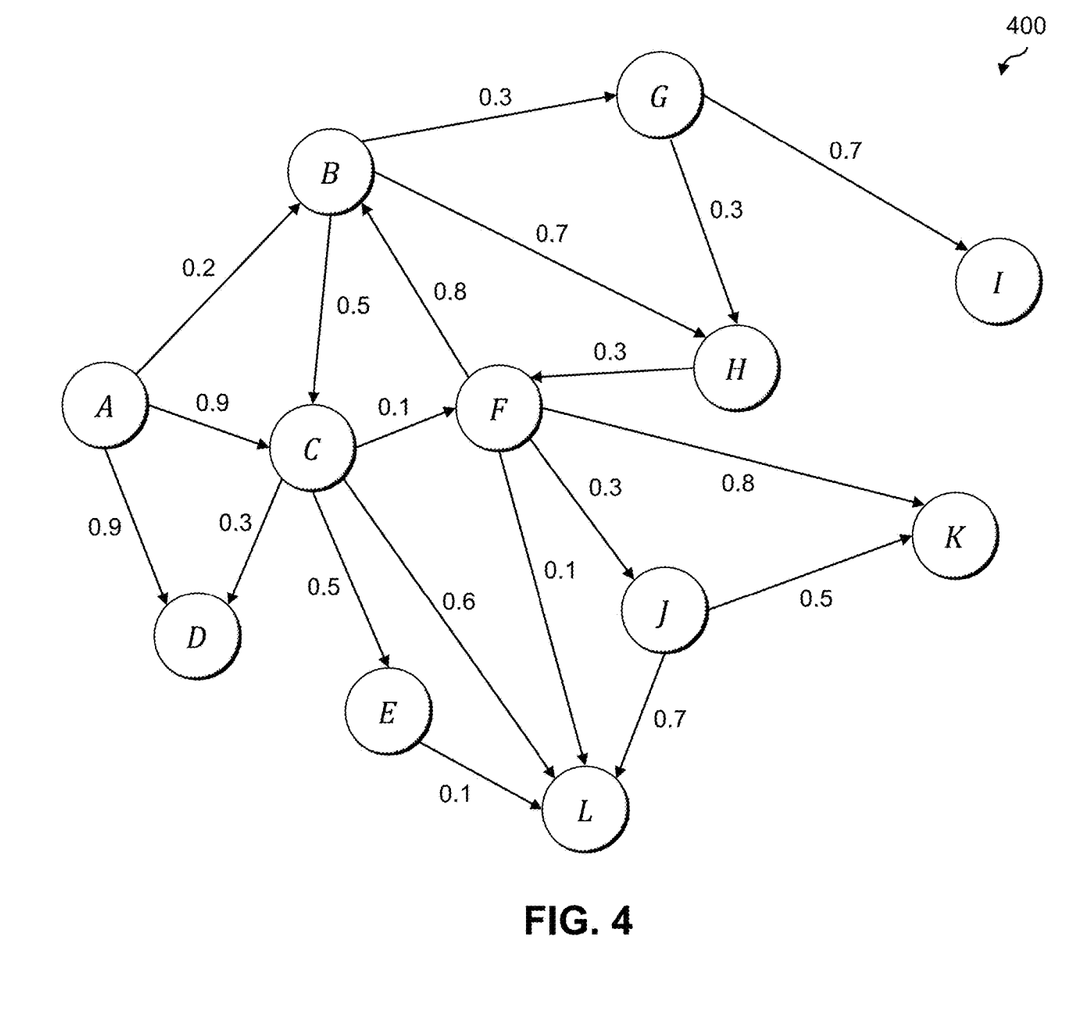
FIG. 4 shows a directed weighted graph of device dependencies in an illustrative embodiment.

In some embodiments, a DMT models the various servers or other devices and their associated invocation-dependency patterns as a directed weighted graph, with the server or other devices as nodes and their call relationships as edges. Edge weights are calculated based on an objective function with multiple determining factors, such as $n_1, n_2, \ldots, n_m$. For example, factor $n_1$ may denote a number of requests, factor $n_2$ may denote data in and data out, etc. The weights may be further normalized between 0 and 1, with 0.0 representing least active call relationships and 1.0 representing most active call relationships. FIG. 4 shows an example directed weighted graph 400, in which unidirectional edge weights denote the relative extent of server or device activity, dependency and relationships among each other. The devices in the graph 400 are denoted A through L.

Figure 5:
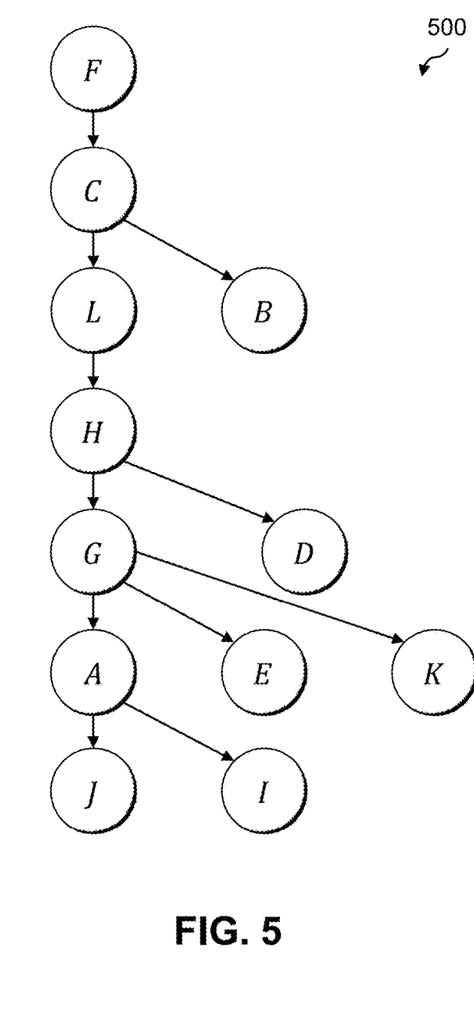
FIG. 5 shows a device dependency chain generated for a set of devices in an illustrative embodiment.

Based on the weighted graph, the DMT identifies or generates a device dependency chain by analyzing and computing device similarity scores based on their activity patterns. In some embodiments, SimRank is used for computing the device similarity scores. In other embodiments, different types of algorithms may be used to compute the device similarity scores. The device with the lowest score in the device dependency chain has the least dependencies in terms of overall device dependency chain activities. The device with the maximum score has the most dependencies relative to the device dependency chain activities. Equations 1 and 2 below compute the IN and OUT scores, respectively, between devices A and B:

$$S(A, B) = \frac{c}{|I(A)| * |I(B)|} \sum_{i=1}^{|I(A)|} \sum_{j=1}^{|I(B)|} S(Ii(A), Ij(B)) \quad (1)$$

$$S(A, B) = \frac{c}{|O(A)| * |O(B)|} \sum_{i=1}^{|O(A)|} \sum_{j=1}^{|O(B)|} S(Oi(A), Oj(B)) \quad (2)$$

where C is a constant between 0 and 1. If there are no IN-neighbors in either A or B (in other words, if I(A)=Ø or I(B)=Ø, then S(A, B)=0. The IN and OUT scores from Equations 1 and 2 combined denote the extent of device activity between A and B. The device which has the maximum score is placed on the top of the device dependency chain, followed by the next highest scoring device, and so on to generate the device dependency chain. Devices with a same score are placed on the same level of the device dependency chain. FIG. 5 shows an example device dependency chain 500 for devices denoted A through L. It should be noted that the example device dependency chain 500 in FIG. 5 does not correspond to the specific weight values shown in the directed weighted graph 400 of FIG. 4.

Figure 6A:
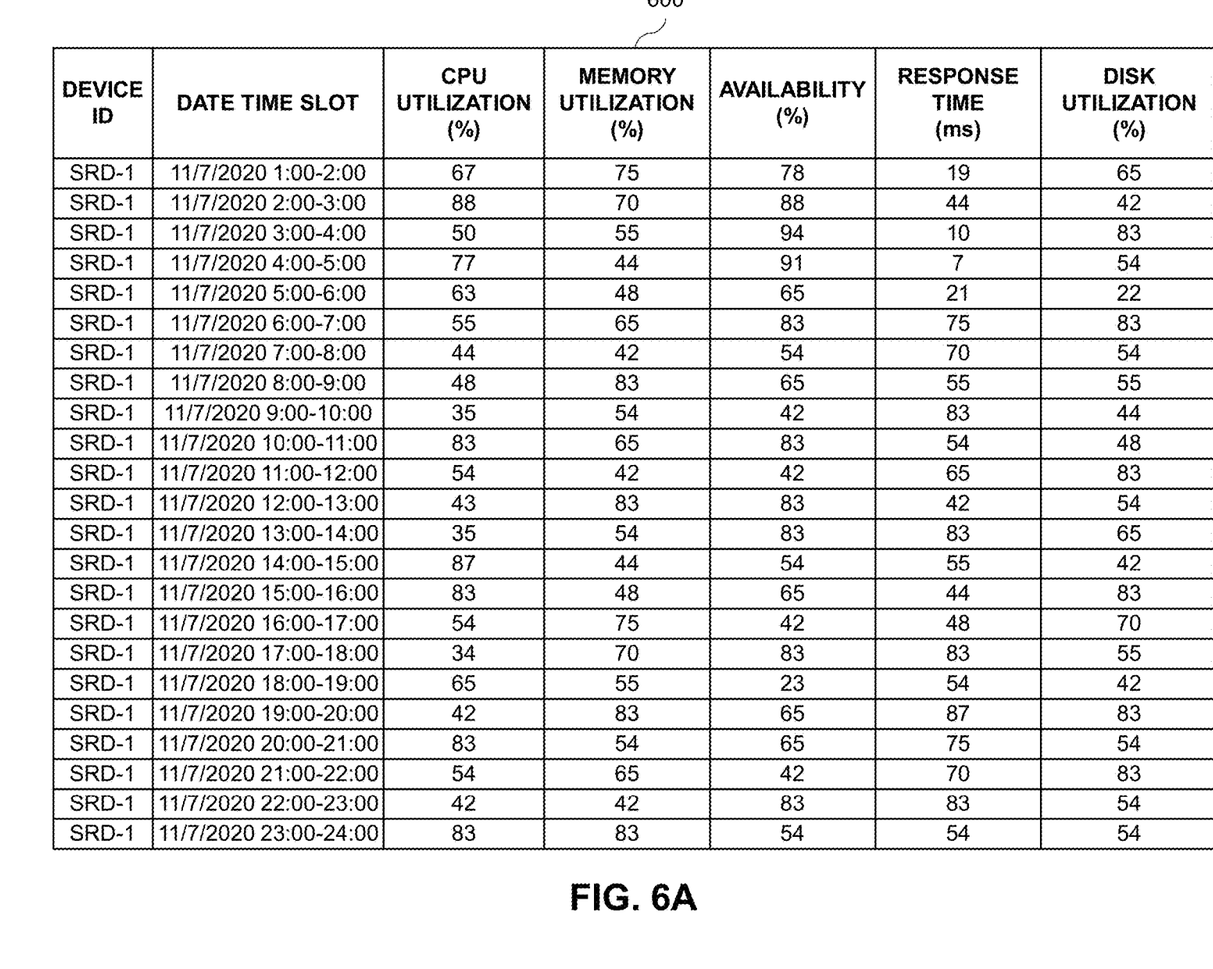
FIGS. 6A and 6B show tables of workload data for devices in an illustrative embodiment.
Figure 6B:
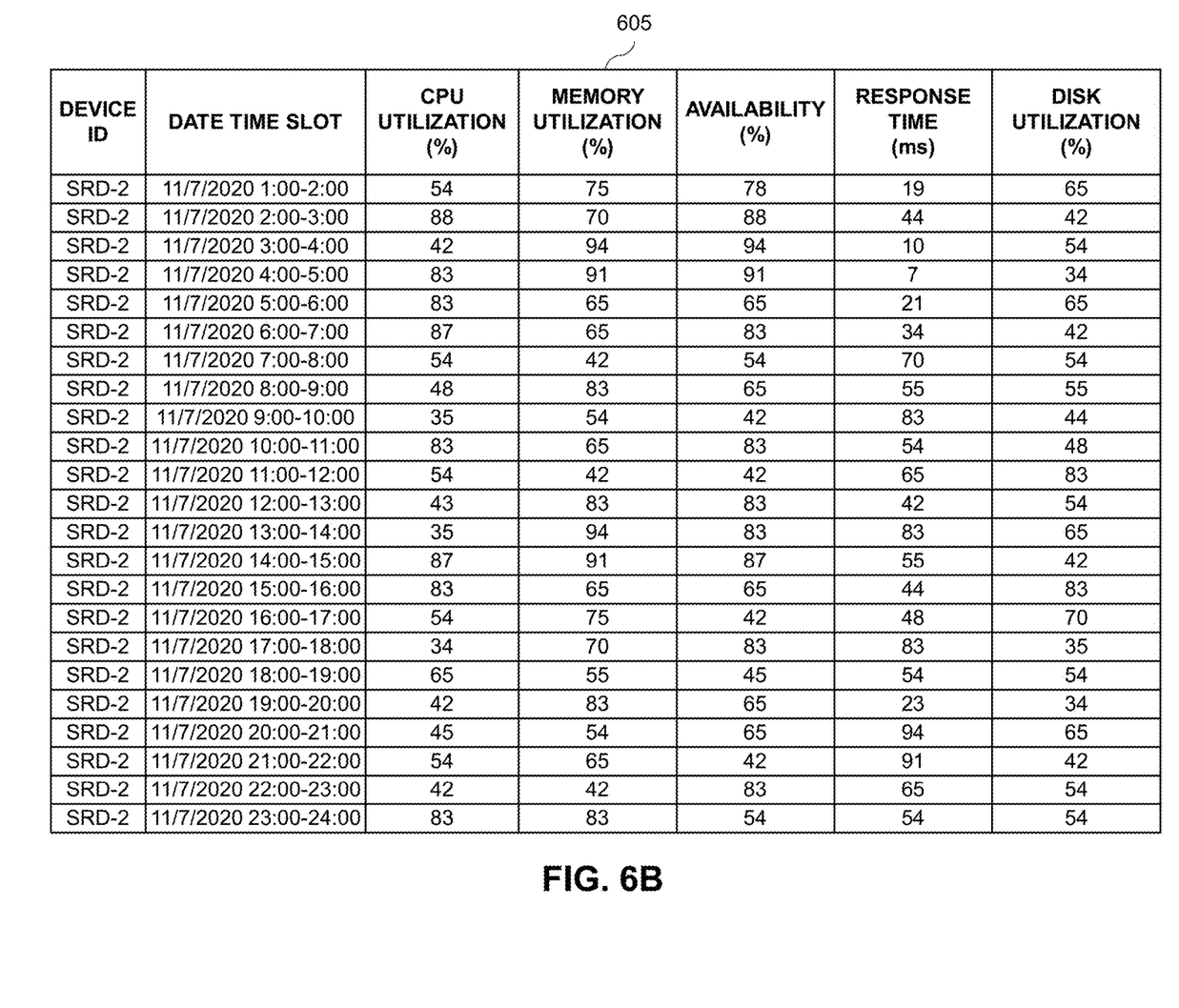
Figure 7:
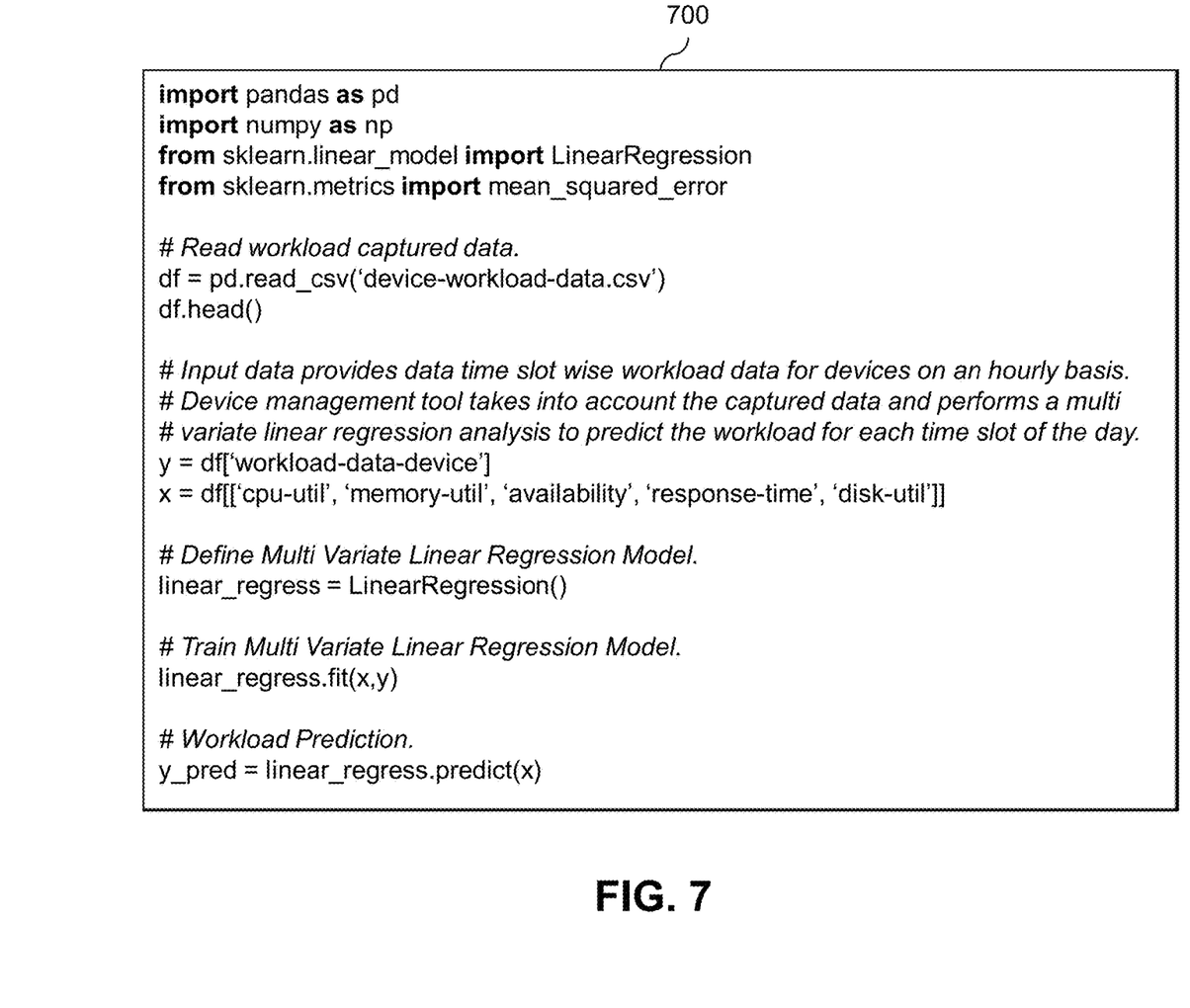
FIG. 7 shows pseudocode for generating workload predictions for devices in an illustrative embodiment.

The DMT collects workload data metrics on a periodic basis (e.g., an hourly basis or some other configurable time period) for each device it manages in a data center or IT infrastructure. FIGS. 6A and 6B show respective tables 600 and 605 illustrating sample workload data for two devices. The tables 600 and 605 include columns for a device identifier (ID), a date time slot, central processing unit (CPU) utilization percentage (%), memory utilization percentage (%), availability percentage (%), response time in milliseconds (ms), and disk utilization percentage (%). The DMT then performs a multivariate regression analysis using machine learning to predict the workload for each slot of a day (or some other configurable time period) for each device. FIG. 7 shows pseudocode 700 for a multivariate linear regression workload prediction.

The DMT then establishes an optimum deployment slot for each device belonging to a device dependency chain, where the optimum deployment slot for a particular device corresponds to the time slot in the day (or other configurable time period) in which that device is predicted to have the lowest workload. The DMT takes into consideration the position of each device in the device dependency chain and its workload prediction for the day (or other configurable time period) to determine an optimum deployment time slot and execution sequence schedule (e.g., for rolling out upgrades to the devices in the device dependency chain).

To populate the overall schedule for rolling out updates, or performing some other action such as performing maintenance on the devices in the device dependency chain, an algorithm is used to select the devices to update in each time slot. To begin, a subset of devices whose lowest workload prediction time slot is the earliest in a given time period (e.g., a day) are identified, and from among the identified subset of devices, the devices with the lowest dependency scores in the device dependency chain are determined. Both such factors (e.g., the workload predictions and the dependency scores) are used to determine which devices to schedule in a particular time slot. In this way, the update or other action deployment schedule is built to ensure that the devices with the least dependency and predicted workload are updated first, followed by devices with relatively more dependencies. It should be noted that each device belonging to an entity space is part of a device dependency chain. Depending on the data set, there is a possibility that a device dependency chain has only one device member, also referred to as an orphan member.

Figure 8:
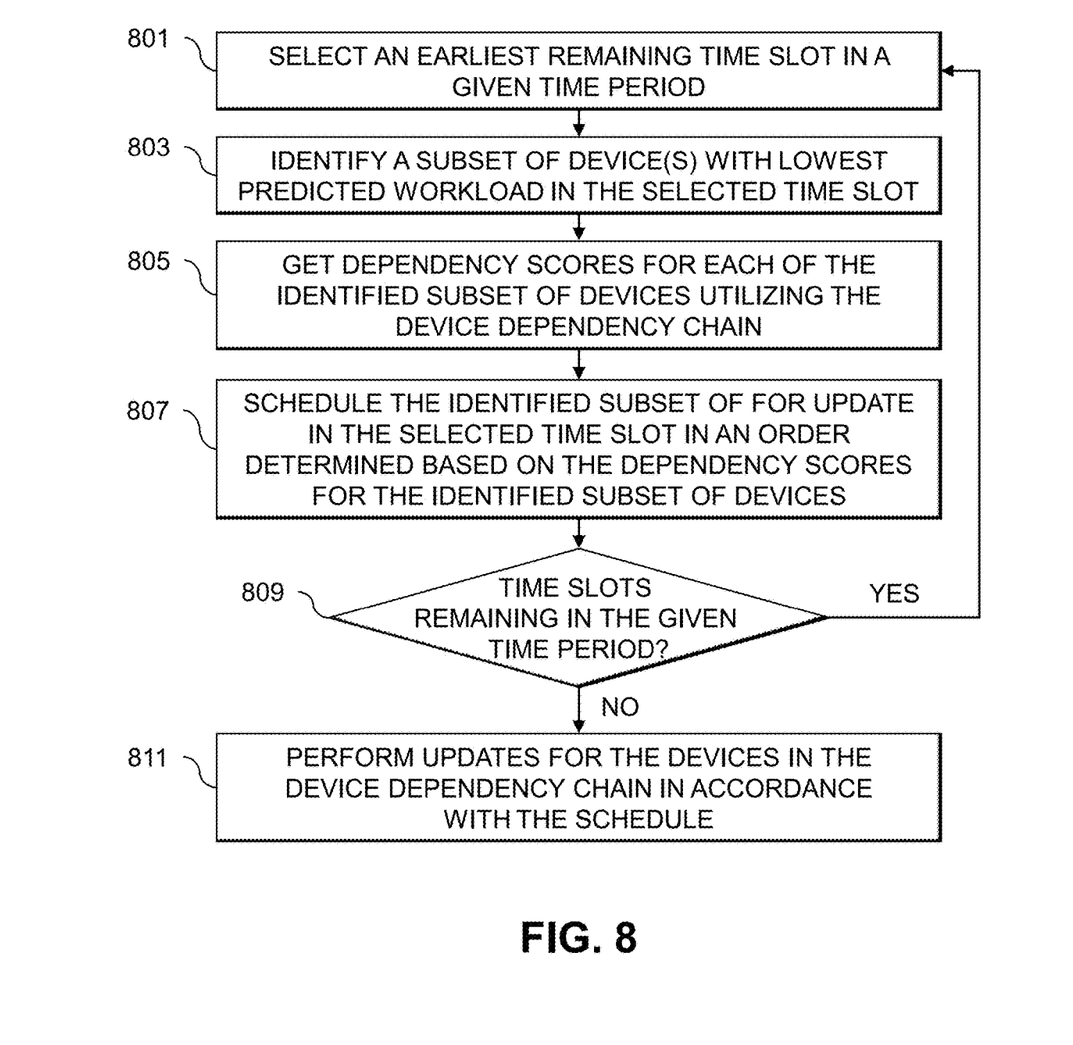
FIG. 8 shows a process flow for building a deployment schedule using a device dependency chain and workload predictions for devices in an illustrative embodiment.

FIG. 8 shows a process flow for generating a schedule for deploying updates to a set of devices characterized by a device dependency chain generated as described above. In step 801, an earliest remaining time slot in a given time period is selected. In step 803, a subset of devices with a lowest predicted workload in the selected time slot are identified. In step 805, dependency scores for each of the identified subset of devices are obtained utilizing the device dependency chain. Then, in step 807, the identified subset of devices from step 803 are scheduled for update in the time slot selected in step 801 in an order determined based on the dependency scores for the identified subset of devices. For example, the identified subset of devices may be scheduled for update starting with the device having the lowest dependency score and then continuing with devices having the next lowest dependency score until all devices in the identified subset are scheduled. A determination is made in step 809 as to whether there are any remaining time slots in the given time period (e.g., a time slot in which devices have not yet been scheduled for update). If yes, the process returns to step 801 to again select the earliest remaining time slot. If no, the process proceeds to step 811 where updates are performed for the devices in the device dependency chain in accordance with the schedule.

It should be noted that it is possible in some iterations of step 803 for there to be no devices having a lowest predicted workload in the time slot selected in step 801 of that iteration. Such a situation may be handled in various ways. In some embodiments, that time slot is skipped such that no devices are scheduled for update during that time slot and processing moves to step 809. In other embodiments, step 803 identifies, from among devices not already scheduled for update, those with the lowest predicted workload in the selected time slot (even though the selected time slot may not correspond to the overall lowest predicted workload for any particular device in the device dependency chain).

In some embodiments, it is also possible that the number of devices in the subset identified in step 803 exceeds some threshold. For example, there may be a case where all devices in the device dependency chain, or a large number of the devices in the device dependency chain, have their lowest predicted workload in the same time slot. In such a case, it may not be desirable to schedule all of the devices for update in the same time slot, and thus only some designated threshold number of devices is scheduled in that time slot, and the others are scheduled for update in their next lowest time slot. Thus, for any particular time slot there may be a threshold set as to the total number of devices that are capable of being updated in that time slot and only up to that threshold number of devices will be scheduled for update in that time slot. If the number of devices having their lowest predicted workload in a given time slot exceeds the threshold number of devices capable of being updated in the given time slot, such devices may be scheduled for update in the time slot corresponding to their next-lowest predicted workload.

Illustrative embodiments provide intelligent, systematic and programmatic techniques for planning and installing upgrades (or performing other designated actions, such as maintenance actions) across devices in a data center or IT infrastructure where the data center or IT infrastructure may include hundreds or thousands of devices. To do so, some embodiments generate a directed weighted graph characterizing dependencies between the devices. This is used to formulate a device dependency chain. Such an approach provides various improvements relative to conventional approaches. For example, a Neo4j graph database provides functionality for producing network dependency graphs, but it requires the construction of a query-like Data Definition Language (DDL) where each node must be hardcoded with populated values for static attributes before a CREATE statement is executed with complex multiple DEPENDS_ON constraints embedded therein. Illustrative embodiments provide superior techniques that leverage weighted graphs based on analysis of computed device similarity scores from their activity patterns which results in a robust, flexible, scalable and easy to maintain dynamically built device dependency chain. Thus, illustrative embodiments are able to proactively predict workload patterns for future device deployment slots based on past historical data using artificial intelligence and machine learning. Some embodiments therefore identify the optimum deployment slot for each device belonging to a device dependency chain.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining deployment schedules for operations to be performed on devices using device dependencies and predicted workloads will now be described in greater detail with reference to FIGS. 9 and 10. Although described in the context of system 100, these platforms may also be used to implement at least portions of other information processing systems in other embodiments.

Figure 9:
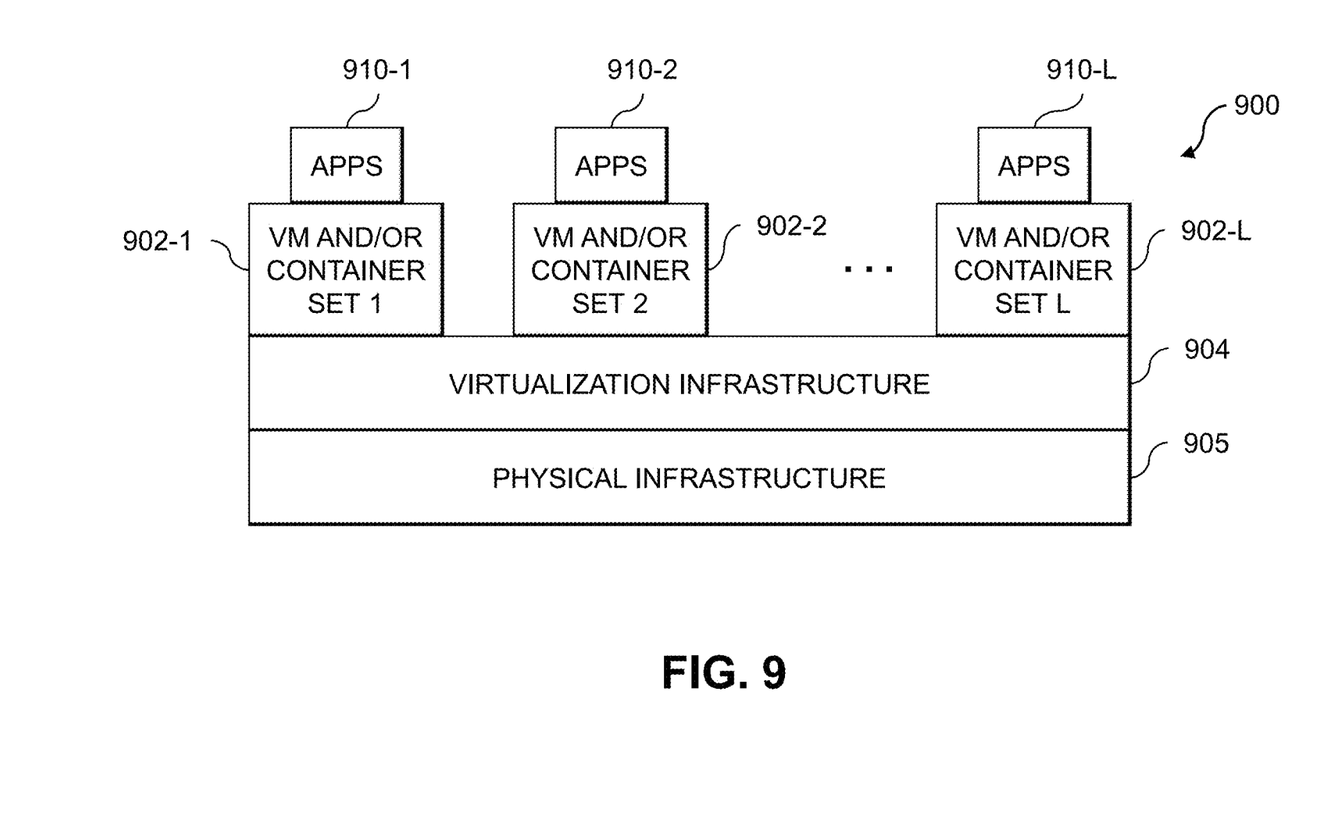
FIGS. 9 and 10 show examples of processing platforms that may be utilized to implement at least a portion of an information processing system in illustrative embodiments.
Figure 10:
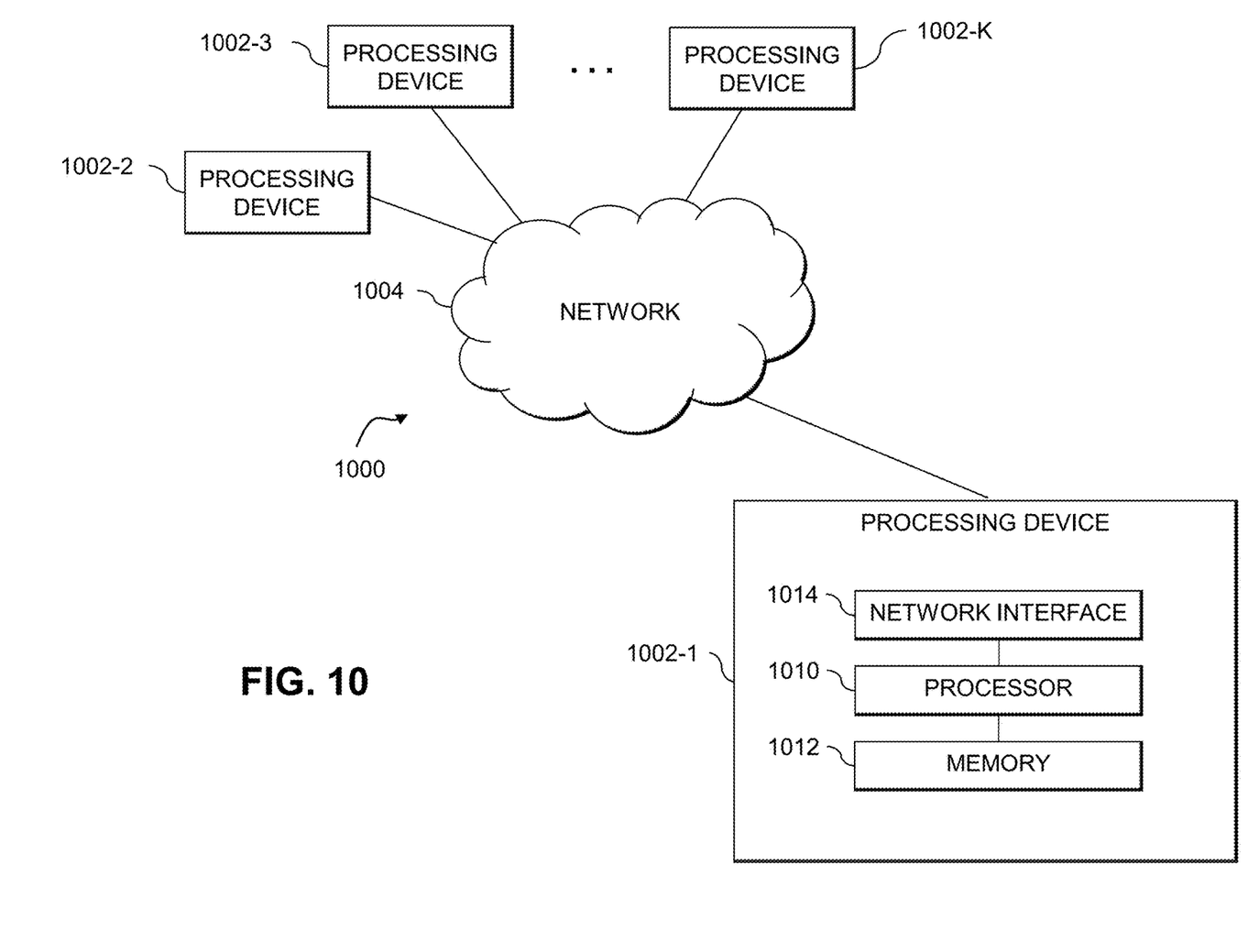

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining deployment schedules for operations to be performed on devices using device dependencies and predicted workloads as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      generating a model of a plurality of devices in an information technology infrastructure, the generated model characterizing relationships between the plurality of devices;
      building a device dependency chain for the plurality of devices based at least in part on the generated model characterizing the relationships between the plurality of devices;
      predicting workload for each of the plurality of devices in each of two or more time slots of a given time period;
      determining a deployment schedule for the plurality of devices based at least in part on the device dependency chain and the predicted workload for each of the plurality of devices in each of the two or more time slots of the given time period;
      identifying an operation to be performed on the plurality of devices; and
      utilizing the deployment schedule to select ones of the plurality of devices on which to perform the identified operation in each of the two or more time slots of the given time period.

2. The apparatus of claim 1 wherein the plurality of devices comprise servers in a data center.

3. The apparatus of claim 1 wherein the plurality of devices comprise Internet of Things devices.

4. The apparatus of claim 1 wherein the model of the plurality of devices comprises a directed weighted graph with nodes representing the plurality of devices and edges between the nodes representing call relationships between the plurality of devices.

5. The apparatus of claim 4 wherein a given edge weight associated with a given edge between a first node and a second node in the directed weighted graph is based at least in part on a number of requests between the first node and the second node and an amount of data exchanged between the first node and the second node.

6. The apparatus of claim 5 wherein the given edge weight comprise a normalized edge weight.

7. The apparatus of claim 1 wherein building the device dependency chain for the plurality of devices comprises computing an overall dependency score for each of the plurality of devices, the overall dependency score for a given device comprising a sum of pairwise dependency scores characterizing activity between the given device and each of at least a subset of other ones of the plurality of devices that have call relationships with the given device.

8. The apparatus of claim 1 wherein the given time period comprises a day, and the two or more time slots comprise hours in the day.

9. The apparatus of claim 1 wherein predicting the workload for each of the plurality of devices in each of the two or more time slots of the given time period comprises utilizing a machine learning regression analysis.

10. The apparatus of claim 9 wherein the machine learning regression analysis comprises a multivariate linear regression analysis.

11. The apparatus of claim 10 wherein the multivariate linear regression analysis is based at least in part on two or more of processor utilization of the plurality of devices, memory utilization of the plurality of devices, availability of the plurality of devices, response time of the plurality of devices, and disk utilization of the plurality of devices.

12. The apparatus of claim 1 wherein determining the deployment schedule comprises, for a given one of the two or more time slots of the given time period:
   identifying a subset of the devices whose lowest predicted workload is in the given time slot; and
   selecting an order in which the identified subset of the devices whose lowest predicted workload is in the given time slot in decreasing order of dependency scores obtained from the device dependency chain.

13. The apparatus of claim 1 wherein the plurality of devices host an application and wherein the identified operation to be performed on the plurality of devices comprises updating the application.

14. The apparatus of claim 1 wherein the deployment schedule specifies a sequence in which the identified operation is to be performed on the plurality of devices.

15. A computer program product comprising a non-transitory processor-readable storage medium having stored therein program code of one or more software programs, wherein the program code when executed by at least one processing device causes the at least one processing device to perform steps of:
   generating a model of a plurality of devices in an information technology infrastructure, the generated model characterizing relationships between the plurality of devices;
   building a device dependency chain for the plurality of devices based at least in part on the generated model characterizing the relationships between the plurality of devices;
   predicting workload for each of the plurality of devices in each of two or more time slots of a given time period;
   determining a deployment schedule for the plurality of devices based at least in part on the device dependency chain and the predicted workload for each of the plurality of devices in each of the two or more time slots of the given time period;
   identifying an operation to be performed on the plurality of devices; and
   utilizing the deployment schedule to select ones of the plurality of devices on which to perform the identified operation in each of the two or more time slots of the given time period.

16. The computer program product of claim 15 wherein determining the deployment schedule comprises, for a given one of the two or more time slots of the given time period:
   identifying a subset of the devices whose lowest predicted workload is in the given time slot; and selecting an order in which the identified subset of the devices whose lowest predicted workload is in the given time slot in decreasing order of dependency scores obtained from the device dependency chain.

17. The computer program product of claim 15 wherein the plurality of devices host an application and wherein the identified operation to be performed on the plurality of devices comprises updating the application.

18. A method comprising:

generating a model of a plurality of devices in an information technology infrastructure, the generated model characterizing relationships between the plurality of devices;

building a device dependency chain for the plurality of devices based at least in part on the generated model characterizing the relationships between the plurality of devices;

predicting workload for each of the plurality of devices in each of two or more time slots of a given time period;

determining a deployment schedule for the plurality of devices based at least in part on the device dependency chain and the predicted workload for each of the plurality of devices in each of the two or more time slots of the given time period;

identifying an operation to be performed on the plurality of devices; and utilizing the deployment schedule to select ones of the plurality of devices on which to perform the identified operation in each of the two or more time slots of the given time period;

wherein the method is performed by at least one processing device comprising a processor coupled to a memory.

19. The method of claim 18 wherein determining the deployment schedule comprises, for a given one of the two or more time slots of the given time period:

identifying a subset of the devices whose lowest predicted workload is in the given time slot; and selecting an order in which the identified subset of the devices whose lowest predicted workload is in the given time slot in decreasing order of dependency scores obtained from the device dependency chain.

20. The method of claim 18 wherein the plurality of devices host an application and wherein the identified operation to be performed on the plurality of devices comprises updating the application.

* * * * *